Patented June 12, 1951

2,556,989

UNITED STATES PATENT OFFICE 2,556,989

COPOLYMERIZATES OF 2-PROPENYL ALCOHOLS WITH DI-2-PROPENYL ITACONATES

Pliny O. Tawney, Passaic, N. J., assignor to United States Rubber Company, New York, N. Y., a corporation of New Jersey No Drawing. Application July 3, 1946, Serial No. 681,427

5 Claims. (Cl. 260—78.5)

My invention is concerned with a new class of unsaturated polymeric materials of relatively low molecular weight which are soluble in a variety of organic solvents and which in the presence of heat and/or catalysts can be converted to insoluble, infusible products by further polymerization or by copolymerization with other unsaturated organic materials capable of addition polymerization. The invention also includes the method for preparing these new products. My new unsaturated interpolymers are prepared by polymerizing a mixture of a monomeric di-2-propenyl itaconate and a monomeric 2-propenyl alcohol.

Although the polymerizability of the di-2-propenyl itaconates is well known to the art, their tendency to form insoluble gels before any very substantial amount of the monomer has been converted to the polymeric form, has seriously restricted their commercial utilization. Existing preparative methods entail interrupting the polymerization of the di-2-propenyl itaconate before gelation occurs and isolating the soluble, fusible polymer. This method is both inefficient and uneconomical since the polymer is obtained in low yields and the large amount of unreacted monomer must be isolated, purified and recycled for subsequent polymerizations. Polymerization in the presence of an inert solvent effects some increase in the yield of soluble polymer if the concentration of monomeric di-2-propenyl itaconate is kept below 40% by weight. However, the rate of polymerization tends to decrease in dilute solutions, the conversion of monomer to polymer is still comparatively inefficient and the solvent increases the material cost, necessitates additional time and labor for its removal and lowers the production capacity of the reaction vessel. The proposals to use elevated temperatures and/or large amounts of peroxide catalyst to improve the yield are of dubious value since under such stringent conditions the polymerization reaction is difficult to control particularly in reaction vessels of industrial size and premature insolubilization of the reaction mixture becomes increasingly difficult to avoid.

I have now unexpectedly discovered that polymerizing a di-2-propenyl itaconate in the presence of a sufficient amount of a 2-propenyl alcohol, by heating the mixture preferably at temperatures below 120° C. and in the presence of conventional peroxidic catalysts, given high yields of soluble, fusible copolymers. The reaction temperatures employed range from about 25° C. to about 120° C., although higher temperatures can be employed if desired. Examples of suitable per-oxy-compound catalysts include acetyl peroxide, benzoyl peroxide, acetyl benzoyl peroxide, succinyl peroxide, and tertiary-butyl hydrogen peroxide. The catalyst concentration is preferably maintained in the range of from 1 to 3 mole percent of the mixture of copolymerizable monomers.

The course of the copolymerization can be followed by observing the increase in viscosity of the reaction mixture, and when the copolymerization has proceeded to the desired extent, the reaction is halted by cooling. The resulting copolymer can be recovered from the reaction mixture by distilling out any unreacted starting materials or by extracting them with a solvent in which the copolymer is insoluble such as n-hexane or carbon tetrachloride. The copolymer can be further purified by dissolving it in a solvent such as acetone, and precipitating it with one of the above mentioned non-solvents.

The concentration of monomers in the reaction mixture does not have to be kept below 40%; in fact, the reaction can be carried out in the absence of any solvent other than the copolymerizable monomers themselves. The relative proportions of the di-2-propenyl itaconate and the 2-propenyl alcohol can be varied over a considerable range depending upon the physical properties and the amount of hydroxymethyl groups desired to be present in the polymeric product. The copolymerization of the di-2-propenyl itaconate with as little as 3% of a 2-propenyl alcohol (based on the weight of the di-2-propenyl itaconate( represses gelation of the reaction mixture during the early stages of the polymerization and ensures the production of an increased yield of a soluble, fusible product. The higher the amount of 2-propenyl alcohol present, the higher is the proportion of monomeric di-2-propenyl itaconate which can be converted to the copolymeric form without insolubilization and optimum yields can be obtained with approximately 200% of the 2-propenyl alcohol present.

Since my copolymers are soluble in 2-propenyl alcohols, I prefer to carry out the copolymerizations in the presence of an excess of the 2-propenyl alcohol, e. g., 350%, for the resulting mobile, free-flowing solutions are easily handled in transfer, mixing, storage, and other mechanical operations to which the solid copolymers themselves might be less amenable. The 2-propenyl alcohol in my invention thus may serve not only as a copolymerizable monomer, but also as a cheap volatile solvent which because it shows little tendency to homopolymerize under these conditions, can be easily removed from the reaction mixture by distillation and recovered for use in subsequent copolymerizations.

The di-2-propenyl itaconates which I have found to be most suitable in the practice of my invention are diallyl itaconate and dimethallyl itaconate. The preferred 2-propenyl alcohols are allyl and methallyl alcohol.

That my products are true copolymers is indicated by elementary analysis and other specific tests. They contain, attached to the polymer chain, hydroxymethyl groups derived from the interpolymerized 2-propenyl alcohol molecules which render the copolymers capable of being modified by agents known to react with primary alcohols, such agents including alkyl, 2-alkenyl, and acyl halides, organic acids and their anhydrides, organic isocyanates and isothiocyanates, aldehydes, etc., as well as the corresponding polyfunctional compounds such as the dihalides, diisocyanates, polycarboxylic acids, etc. By such reactions my new copolymers can be converted into other modified polymers having desirable properties.

My copolymers can be cast or molded in a known manner to form rods, blocks, or sheets. They can also be dissolved in an appropriate solvent and employed as lacquers or as impregnating and water-proofing compositions.

Application of heat to compositions containing my unsaturated copolymers, particularly in the presence of a polymerization catalyst, induces further polymerization, and the resulting crosslinked products, are quite indifferent to heat and are strongly resistant to attack by solvents, such as acetone and xylene. Suitable dyes, pigments, fillers, and plasticizers can be incorporated with my interpolymers at the soluble, fusible stage prior to final cure.

My unsaturated copolymers can be dissolved in organic solvents, particularly in copolymerizable compounds containing an ethylenic linkage such as methyl acrylate, methyl methacrylate, diallyl fumarate, vinyl acetate, allyl acrylate, etc. The resulting solutions can be totally interpolymerized to insoluble, infusible products without leaving any solvent to be evaporated. Even at high solids content, many of these solutions are still quite fluid, and can be employed as coating materials by spraying, brushing, and dipping. They can also be employed in casting, laminating, and impregnating operations particularly where articles capable of being pre-formed and then "set" or cured in a final shape are desired.

The following examples illustrate my invention in more detail, all parts being by weight.

EXAMPLE 1

To illustrate my discovery that by copolymerizing di-2-propenyl itaconates with 2-propenyl alcohols, gelation of the reaction mixture can be repressed, mixtures of monomeric diallyl itaconate with various proportions of allyl and methallyl alcohol are heated at 60° C. in the presence of benzoyl peroxide as catalyst, to the point of incipient gelation where the polymerizations are halted by rapid chilling. The reaction mixtures are then poured into n-hexane and the precipitated copolymers are further purified by repeated solution in acetone and precipitation with n-hexane. The polymeric solids are then dried in vacuo to constant weight. The pertinent data are summarized in Table I below. Although not within the scope of my invention, the polymerization of diallyl itaconate in the absence of 2-propenyl alcohols is also included (I—a) for purposes of comparison and to more clearly demonstrate the inherent advantages of my invention. The numbers all refer to parts by weight unless otherwise indicated.

Table I

| Ex. | Diallyl Itaconate | Allyl Alcohol | Methallyl Alcohol | Benzoyl Peroxide | Time to Gel Point, hours | Polymeric Product |
|---|---|---|---|---|---|---|
| a | 28.0 | | | 0.32 | 1.2 | 2.72 |
| b | 28.0 | 0.78 | | 0.35 | 3.4 | 5.05 |
| c | 28.0 | 1.55 | | 0.38 | 5.4 | 6.55 |
| d | 28.0 | 3.62 | | 0.47 | 13.1 | 7.7 |
| e | 28.0 | 7.75 | | 1.35 | 47.0 | 13.90 |
| f | 28.0 | 11.60 | | 2.49 | 11.7 | 15.3 |
| g | 28.0 | 15.50 | | 2.89 | 27.0 | 19.35 |
| h | 28.0 | 18.40 | | 3.20 | 30.0 | 21.40 |
| i | 28.0 | 23.30 | | 5.79 | 30.0 | 23.70 |
| j | 28.0 | 31.1 | | 4.83 | 49.6 | 28.00 |
| k | 28.0 | 43.6 | | 4.31 | ¹160.7 | 33.30 |
| l | 28.0 | | 11.60 | 1.41 | ¹88.0 | 17.6 |
| m | 28.0 | | 43.8 | 2.4 | ¹160.7 | 29.4 |

¹ No gelation.

Comparison of (a) and (b) in Table I above clearly shows that the copolymerization of di-2-propenyl itaconate, with as little as approximately 3% by weight of a 2-propenyl alcohol is markedly effective in repressing gelation and thereby increasing the yield of soluble, unsaturated polymeric material. Succeeding examples in Table I indicated that this effect becomes more pronounced as the amount of the copolymerizable 2-propenyl alcohol in the polymerizing reaction mixture is increased and that by this method large amounts of a monomeric di-2-propenyl itaconate can be converted to the polymeric form without insolubilization.

A sample of the crude reaction mixture of I—d above, i. e., a solution of allyl alcohol-diallyl itaconate copolymer in allyl alcohol is poured onto a glass panel and baked for 0.4 hour at 200° C. to yield a solvent-resistant film which is clear and colorless. Surprisingly little discoloration occurs upon heating the film for an additional hour at 200° C.

EXAMPLE 2

A mixture of 105.1 parts of diallyl itaconate, 164.2 parts of allyl alcohol and 5.18 parts of tertiary-butyl hydrogen peroxide is heated at reflux for 24 hours. The major proportion of the unreacted allylic alcohol is then removed by distillation under diminished pressure, and the polymeric residue is isolated and purified in the manner of Example 1 above. By this method, 123.6 parts of solid product are obtained which is soluble in acetone, chloroform, and 2-propenyl alcohols.

*Analysis.*—Found: C, 62.98%; H, 7.11%; Iodine Number (Wijs) 160.2; Limiting Viscosity, $[\eta]_0$, in acetone 0.054.

The high iodine number indicates the presence of a high degree of residual unsaturation which facilitates rapid conversion to insoluble, infusible products by further polymerization or by copolymerization with other unsaturated materials.

EXAMPLE 3

To illustrate the conversion of my new copolymers to insoluble, infusible products by interpolymerizing the soluble potentially polymerizable copolymers of this invention with polymerizable organic compounds containing ethylenic

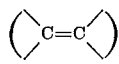

unsaturation, mixtures of 7 parts of the soluble, unsaturated copolymer prepared in Example 2 above and 3 parts of various copolymerizable monomers are heated with benzoyl peroxide at 60° C. to form clear, colorless, insoluble castings. The monomers, peroxide concentrations, curing times and hardnesses of the resulting castings are listed below in Table II.

Table II

| Ex. | Copolymerizable Monomer | Benzoyl Peroxide, Parts | Curing Time, Hours | Hardness, Rockwell L Scale |
|---|---|---|---|---|
| a | Methyl Acrylate | 0.186 | 18 | 69 |
| b | Styrene | 0.093 | 15 | 39 |
| c | Diallyl Fumarate | 0.091 | 15 | 97 |
| d | Diethyl Fumarate | 0.053 | 43 | 105 |

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A polymerizable binary monomer mix, polymerizable by the addition of a peroxidic catalyst, said binary mix being composed of a monomeric 2-propen-1-ol diester of itaconic acid and a monomeric 2-propenyl alcohol, in which the alcohol for both monomers is selected from the class consisting of allyl alcohol and methallyl alcohol, and the proportion of the said monomeric 2-propenyl alcohol being at least 3% based on the weight of the itaconate monomer.

2. An acetone-soluble unsaturated binary copolymerizate of a monomeric 2-propen-1-ol diester of itaconic acid and a monomeric 2-propenyl alcohol, in which the alcohol for both monomers is selected from the class consisting of allyl alcohol and methallyl alcohol, and the proportion of the said monomeric 2-propenyl alcohol being at least 3% based on the weight of the itaconate monomer.

3. An acetone-soluble unsaturated binary copolymerizate of monomeric allyl alcohol and diallyl itaconate, the proportion of said alcohol being at least 3% based on the weight of the itaconate monomer.

4. An acetone-soluble unsaturated binary copolymerizate of monomeric methallyl alcohol and diallyl itaconate, the proportion of said alcohol being at least 3% based on the weight of the itaconate monomer.

5. A method which comprises polymerizing a binary mixture of monomers composed of a monomeric 2-propen-1-ol diester of itaconic acid and a monomeric 2-propenyl alcohol, in which the alcohol for both monomers is selected from the class consisting of allyl alcohol and methallyl alcohol, and the proportion of the said monomeric 2-propenyl alcohol being at least 3% based on the weight of the itaconate monomer, and a peroxidic compound, the polymerization being carried out at a temperature in the range from about 25° C. to about 120° C., and halting the polymerization before the gel point to form a high yield of an acetone-soluble unsaturated copolymerizate of the said diester and the said 2-propenyl alcohol.

PLINY O. TAWNEY.

REFERENCES CITED

The following references are of record in the file of this patent:

UNITED STATES PATENTS

| Number | Name | Date |
|---|---|---|
| 2,221,663 | Rothrock | Nov. 12, 1940 |
| 2,273,891 | Pollack et al. | Feb. 24, 1942 |
| 2,332,900 | D'Alelio | Oct. 26, 1943 |
| 2,378,195 | D'Alelio | June 12, 1945 |
| 2,441,515 | Snyder | May 11, 1948 |
| 2,504,052 | Snyder | Apr. 11, 1950 |